United States Patent
Nakamura et al.

(10) Patent No.: US 8,526,164 B2
(45) Date of Patent: Sep. 3, 2013

(54) LAMINATED CERAMIC CAPACITOR

(75) Inventors: Tomoyuki Nakamura, Nagaokakyo (JP); Tomonori Muraki, Nagaokakyo (JP); Makoto Matsuda, Nagaokakyo (JP); Akihiro Shiota, Nagaokakyo (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 145 days.

(21) Appl. No.: 13/039,379

(22) Filed: Mar. 3, 2011

(65) Prior Publication Data

US 2011/0216472 A1 Sep. 8, 2011

(30) Foreign Application Priority Data

Mar. 5, 2010 (JP) ................. 2010-049458

(51) Int. Cl.
*H01G 4/06* (2006.01)
*C04B 35/00* (2006.01)

(52) U.S. Cl.
USPC ............. 361/321.4; 361/321.1; 361/321.2; 361/321.3; 501/138; 501/139

(58) Field of Classification Search
USPC .............. 361/321.1–321.4; 501/138, 139
See application file for complete search history.

(56) References Cited

U.S. PATENT DOCUMENTS

| | | |
|---|---|---|
| 7,638,451 B2 | 12/2009 | Inoue et al. |
| 2002/0041061 A1* | 4/2002 | Nomura et al. ............... 264/614 |
| 2004/0176239 A1 | 9/2004 | Nakamura et al. |
| 2009/0128990 A1 | 5/2009 | Inoue et al. |
| 2010/0014210 A1 | 1/2010 | Nakamura et al. |

FOREIGN PATENT DOCUMENTS

| | | |
|---|---|---|
| JP | 3207846 A | 9/1991 |
| JP | 8-241828 A | 9/1996 |
| JP | 2000340450 A | 12/2000 |
| JP | 2002270458 A | 9/2002 |
| JP | 2004-262717 A | 9/2004 |
| JP | 2010-024086 A | 2/2010 |
| WO | WO-2006025205 A1 | 3/2006 |
| WO | WO-2008-010412 A1 | 1/2008 |

OTHER PUBLICATIONS

Japanese Office Action issued for corresponding JP 2010-049458, dispatch date Jul. 17, 2012.

* cited by examiner

*Primary Examiner* — David M Sinclair
*Assistant Examiner* — Arun Ramaswamy
(74) *Attorney, Agent, or Firm* — Dickstein Shapiro LLP (57) ABSTRACT

A laminated ceramic capacitor which provides favorable properties and characteristics such as dielectric characteristics, insulation properties, temperature characteristics, and high temperature load characteristics and provides favorable thermal shock resistance, even when dielectric ceramic layers are reduced in layer thickness to increase the number of layers has dielectric ceramic layers containing, as their main constituent, a barium titanate based compound represented by the general formula $ABO_3$ and internal electrodes containing Ni as their main constituent, which are stacked alternately. A crystalline oxide containing at least Mg and Li is present in at least either one of the internal electrodes and the dielectric ceramic layers. The crystalline oxide is preferably present mostly in contact with Ni in the internal electrodes.

19 Claims, 1 Drawing Sheet

LAMINATED CERAMIC CAPACITOR

BACKGROUND OF THE INVENTION

1. Field of the Invention

The present invention relates to a laminated ceramic capacitor, and more particularly, to a laminated ceramic capacitor which includes a dielectric ceramic layer containing a barium titanate based compound as its main constituent and includes an internal electrode containing Ni as its main constituent.

2. Description of the Related Art

Conventionally, barium titanate based compounds with high dielectric constants have been used as ceramic materials for laminated ceramic capacitors, and inexpensive Ni which has a favorable conductivity has been widely used as an internal electrode material.

Furthermore, a reduction in size and increase in capacitance for laminated ceramic capacitors have been progressed rapidly with the developments in electronics technology in recent years.

This type of laminated ceramic capacitor has dielectric ceramic layers and internal electrodes which are stacked alternately, and has external electrodes formed on both ends of a ceramic sintered body obtained by a firing treatment. The dielectric ceramic layers are reduced in layer thickness and a larger number of layers stacked, thereby allowing for a reduction in size and an increase in capacitance for the laminated ceramic capacitors.

Japanese Unexamined Patent Publication No. 2002-270458 (claim 1, paragraphs 0031, 0033 and 0056) proposes a laminated ceramic capacitor in which dielectric ceramic layers have a defective area ratio of 1% or less at a polished surface in cross section, and interface layers containing a constituent of the dielectric ceramic layers and a constituent of internal electrodes are formed between the dielectric ceramic layers and the internal electrodes.

Japanese Unexamined Patent Publication No. 2002-270458 (claim 1, paragraphs 0031, 0033 and 0056) discloses a laminated ceramic capacitor which has dielectric ceramic layers containing at least Ba, Ti, Si, and Mg, internal electrodes containing at least Si, and interface layers containing an oxide of Ba—Ti—Si—Mg as their main constituent.

In the case of Japanese Unexamined Patent Publication No. 2002-270458 (claim 1, paragraphs 0031, 0033 and 0056), the dielectric ceramic layers are formed to have a defective area ratio of 1% or less at a polished surface in cross section thereof, in order for the dielectric ceramic layers to have a dense structure, and in addition, the formation of the interface layers provides stronger joining between the dielectric ceramic layers and the internal electrodes. Furthermore, the dielectric ceramic layers, the internal electrodes, and the interface layers contain the constituent elements mentioned above, thereby providing favorable thermal shock resistance, high temperature load characteristics, and dielectric characteristics in the case of a laminated ceramic capacitor with the dielectric ceramic layers being 3 μm in thickness and a number of stacked layers on the order of 150.

SUMMARY OF THE INVENTION

In recent years, reduction in size and the increase in capacitance have been further required for the laminated ceramic capacitors, and laminated ceramic capacitors have been required which provide various favorable properties and characteristics even when the dielectric ceramic layer is reduced in layer thickness to 1 μm or less to increase the number of stacked layers to 400 or more.

In the case of Japanese Unexamined Patent Publication No. 2002-270458 (claim 1, paragraphs 0031, 0033 and 0056), however, although satisfactory thermal shock resistance, high temperature load characteristics, and dielectric characteristics can be obtained with the dielectric ceramic layer of 3 μm in thickness and the number of stacked layers on the order of 150, there is a possibility that when the dielectric ceramic layer is reduced in layer thickness to 1 μm or less to increase the number of stacked layers to 400 or more as described above, the thermal shock resistance may degrade to cause defects such as cracks when a rapid change in temperature is encountered as in the case of mounting.

The present invention has been achieved in view of these circumstances, and an object of the present invention is to provide a laminated ceramic capacitor which provides favorable properties and characteristics such as dielectric characteristics, insulation properties, temperature characteristics, and high temperature load characteristics and provide favorable thermal shock resistance even when the dielectric ceramic layer is further reduced in layer thickness to increase the number of layers.

The present inventors have conducted earnest studies on laminated ceramic capacitors using a barium titanate based compound for a ceramic material and using Ni for an internal electrode material and found that when either one of dielectric ceramic layers and internal electrodes contains a crystalline oxide containing at least Mg—Li, the thermal shock resistance can be improved while ensuring properties and characteristics such as dielectric characteristics, insulation properties, temperature characteristics of capacitance, and high temperature load characteristics.

The present invention has been made based on such findings, and provides a laminated ceramic capacitor including dielectric ceramic layers containing, as their main constituent, a barium titanate based compound represented by the general formula $ABO_3$ and internal electrodes containing Ni as their main constituent, the dielectric ceramic layers and the internal electrodes stacked alternately, wherein a crystalline oxide containing at least Mg and Li is present in at least either of the internal electrodes and the dielectric ceramic layers.

The present invention also provides the laminated ceramic capacitor wherein 70% or more of the crystalline oxide is present in contact with Ni in the internal electrodes.

The present invention further provides the laminated ceramic capacitor wherein the barium titanate based compound contains Ba in the range of 78 to 100 mol %, Sr in the range of 0 to 2 mol %, and Ca in the range of 0 to 20 mol % at the A site, and contains Ti in the range of 96 to 100 mol %, Zr in the range of 0 to 2 mol %, and Hf in the range of 0 to 2 mol % at the B site.

In addition, as a result of further earnest studies conducted by the present inventors, it has been found that when the dielectric ceramic layers contain therein a specific rare earth element R such as La or Ce and a specific metal element M such as Mn or Ni in a predetermined amount, the high temperature load characteristics can be further improved while keeping the various properties and characteristics favorable, such as the dielectric characteristics, the insulation properties, the temperature characteristics, and the thermal shock resistance, and the reliability can be thus further improved.

That is, the present invention provides the laminated ceramic capacitor wherein the laminated ceramic capacitor contains at least one of: at least one element R selected from among La, Ce, Pr, Nd, Sm, Eu, Gd, Tb, Dy, Ho, Er, Tm, Yb, Lu, and Y; and at least one element M selected from among Mn, Ni, Co, Fe, Cr, Cu, Mg, Li, Al, Mo, W, and V, and the content of the element R is 0.1 to 3.0 parts by mol with respect to 100 parts by mol of the main constituent, and the content of the element M is 0.2 to 5 parts by mol with respect to 100 parts by mol of the main constituent.

In the laminated ceramic capacitor described above, the crystalline oxide containing at least Mg and Li is present in at least one of the dielectric ceramic layers and the internal electrodes, thus allowing the crystalline oxide to come into contact with Ni in the internal electrodes to improve strength, and thereby allowing the thermal shock to be cushioned. As a result, the thermal shock resistance can be improved while ensuring the properties and characteristics such as the dielectric characteristics, the insulation properties, the temperature characteristics, and the high temperature load characteristics.

More specifically, laminated ceramic capacitors can be obtained which have the favorable properties and characteristics described above, and no defects such as cracks result even when a rapid change in temperature is encountered in the case of mounting.

In addition, the laminated ceramic capacitor contains at least one of the specific rare earth element R and the specific metal element M, the content of the element R is 0.1 to 3.0 parts by mol with respect to 100 parts by mol of the main constituent, and the content of the element M is 0.2 to 5 parts by mol with respect to 100 parts by mol of the main constituent. Thus, laminated ceramic capacitors can be obtained which have further favorable high temperature load characteristics and have a long life with great reliability.

DETAILED DESCRIPTION OF THE INVENTION

Next, an embodiment of the present invention will be described in detail.

Figure 1:
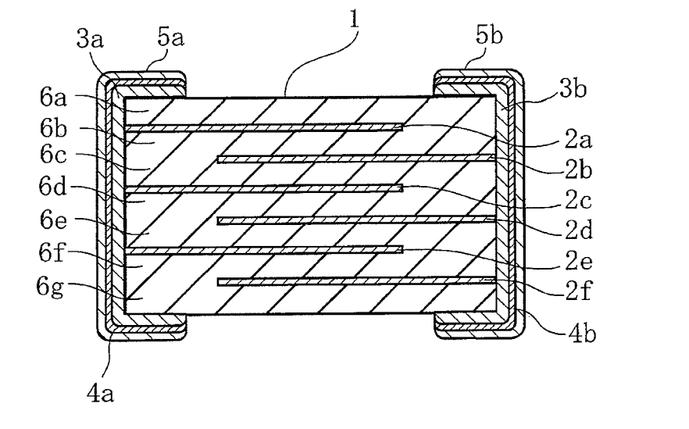
FIG. 1 is a cross-sectional view schematically illustrating an embodiment of a laminated ceramic capacitor according to the present invention.

FIG. 1 is a cross-sectional view schematically illustrating an embodiment of a laminated ceramic capacitor according to the present invention.

The laminated ceramic capacitor has internal electrodes 2a to 2f containing Ni as its main constituent, which are buried in a ceramic sintered body 1, external electrodes 3a and 3b formed at the both ends of the ceramic sintered body 1, and further first plating films 4a and 4b and second plating films 5a and 5b formed on the surfaces of the external electrodes 3a and 3b.

More specifically, the ceramic sintered body 1 is composed of dielectric ceramic layers 6a to 6g and internal electrode layers 2a to 2f which are staked alternately and fired, and the internal electrode layers 2a, 2c, and 2e are electrically connected to the external electrode 3a, whereas the internal electrode layers 2b, 2d, and 2f are electrically connected to the external electrode 3b. Furthermore, capacitance is formed between the opposed surfaces of the internal electrode layers 2a, 2c, and 2e and internal electrode layers 2b, 2d, and 2f.

The dielectric ceramic layers 6a to 6g contain a barium titanate based compound as their main constituent.

This barium titanate based compound has a perovskite-type structure represented by the general formula $ABO_3$, and specific forms include $BaTiO_3$ with Ba formed at the A site and Ti formed at the B site; $(Ba, Ca)TiO_3$, $(Ba, Sr) TiO_3$, or $(Ba, Ca, Sr)TiO_3$ with some of Ba substituted by at least one element of Ca and Sr; $Ba(Ti, Zr)O_3$, $Ba(Ti, Hf)O_3$, or $Ba(Ti, Zr, Hf)O_3$ with some of Ti substituted by at least one element of Zr and Hf, or combinations thereof.

However, in the case of substituting some of Ba by at least either one of Sr and Ca, the Sr and Ca are preferably 2 mol % or less and 20 mol % or less, respectively. More specifically, the barium titanate based compound preferably contains, at the A site, Ba in the range of 78 to 100 mol %, Sr in the range of 0 to 2 mol %, and Ca in the range of 0 to 20 mol %.

Alternatively, in the case of substituting some of Ti by at least either one of Zr and Hf, the Zr and Hf are preferably 2 mol % or less and 2 mol % or less, respectively. More specifically, the barium titanate based compound preferably contains, at the B site, Ti in the range of 96 to 100 mol %, Zr in the range of 0 to 2 mol %, and Hf in the range of 0 to 2 mol %.

In addition, while the molar ratio of the combination of the A site with the B site is 1.000 stoichiometrically, the A site and the B site are combined so as to have an excess amount of A site or B site, if necessary, to such an extent that the various characteristics, the sintering property, etc. are not affected.

Furthermore, at least one of the dielectric ceramic layers 6a to 6g and the internal electrodes 2a to 2h contain a Mg—Li—O based crystalline oxide containing at least Mg and Li in the present embodiment.

This composition allows the thermal shock resistance to be improved while ensuring properties and characteristics such as dielectric characteristics, insulation properties, temperature characteristics, and high temperature load characteristics, even when the dielectric ceramic layers are reduced in layer thickness to 1 μm or less to increase the number of layers to 400 or more, thereby avoiding defects such as cracks from being caused in the laminated ceramic capacitor even when there is a rapid change in temperature, as in the case of mounting.

More specifically, for example, when a Mg—Li—O based crystalline oxide is contained in the internal electrodes 2a to 2h, the Mg—Li—O based crystalline oxide is present in contact with Ni in the internal electrodes 2a to 2h such that 70% or more of the Mg—Li—O based crystalline oxide auxiliary component of the grains in terms of number are in such contact, resulting in an increase in the to rapid change in temperature in the case of mounting and allowing to the thermal shock resistance to be improved.

Alternatively, when a Mg—Li—O based crystalline oxide is contained in the dielectric ceramic layers 6a to 6g, the reduction of the dielectric ceramic layers 6a to 6g in layer thickness to 1 μm or less causes the Mg—Li—O based crystalline oxide to be present at the interfaces between the internal electrodes 2a to 2h and be in contact with Ni in the internal electrodes 2a to 2h. In this case, the Mg—Li—O based crystalline oxide is also present in contact with Ni in the internal electrodes 2a to 2h, resulting in an increase in the resistance to rapid change in temperature and allowing to the thermal shock resistance to be improved.

It is to be noted that while the Mg—Li—O based crystalline oxide may be contained in at least one of the dielectric ceramic layers 6a to 6g and the internal electrodes 2a to 2h as described above, the internal electrodes 2a to 2h more preferably contain the Mg—Li—O based crystalline oxide because 70% or more of the Mg—Li—O based crystalline oxide is present in contact with the Ni.

The content of the Mg—Li—O based crystalline oxide in the laminated ceramic capacitor is not particularly limited as long as the content falls within the range that has no influence on the other properties and characteristics such as dielectric characteristics, temperature characteristics of capacitance, and high-temperature load characteristics, and for example, the dielectric ceramic layers and the Mg—Li—O based crystalline oxide are combined so as to provide a ratio by weight of 99.7 to 99.9:0.3 to 0.1.

What is required is that the Mg—Li—O based crystalline oxide is to contain at least Mg and Li, and for example, a Mg—Li—O based crystalline oxide containing other oxide components of Ni, Ba, Mn or the like even allows the desired function effect to be produced.

It is also preferable to add a specific rare earth element oxide $RO_{3/2}$ and/or a specific metal oxide $MO_v$ (v is a positive number determined unambiguously by the valence of the metal element M) into the dielectric ceramic layers 6a to 6g.

In this case, examples of the specific rare earth element R include La, Ce, Pr, Nd, Sm, Eu, Gd, Tb, Dy, Ho, Er, Tm, Yb, Lu, and Y, and examples of the specific metal element M include Mn, Ni, Co, Fe, Cr, Cu, Mg, Li, Al, Mo, W, and V.

The addition of these specific rare earth element R and specific metal element M can improve the high temperature load characteristics, and thus provide greater reliability.

In the case of adding the specific rare earth element R, the specific rare earth element R is preferably added at 0.1 to 3 parts by mol with respect to 100 parts by mol of the barium titanate based compound as a main constituent. This is because there is a possibility that the effect of improvement in reliability will not be produced in the case of adding the specific rare earth element R at less than 0.1 parts by mol with respect to 100 parts by mol of the main constituent, as compared with the case of adding no specific rare earth element R, whereas there is a possibility that the addition of the specific rare earth element R at greater than 3 parts by mol will decrease the dielectric characteristics.

In the case of adding the specific metal element M, the specific metal element M is preferably added at 0.1 to 5 parts by mol with respect to 100 parts by mol of the main constituent. This is because there is a possibility that the effect of improvement in reliability will not be produced in the case of the specific metal element M at less than 0.1 parts by mol with respect to 100 parts by mol of the main constituent, as compared with the case of adding no specific metal element M, whereas there is a possibility that the addition of the specific metal element M at greater than 5 parts by mol will decrease the dielectric characteristics.

Next, a method for manufacturing the laminated ceramic capacitor will be described in detail for the case of the internal electrodes containing therein the Mg—Li—O based crystalline oxide.

First, a Ba compound and a Ti compound are prepared as ceramic raw materials, and if necessary, a Ca compound, a Sr compound, a Zr compound, a Hf compound, etc., are prepared. Then, these ceramic raw materials are weighed in predetermined amounts, and the weighed materials are charged into a ball mill along with a grinding medium such as PSZ (Partially Stabilized Zirconia) balls and pure water for mixing and grinding the materials sufficiently in a wet manner, and after drying, subjected to a heat treatment at a temperature of 900° C. to 1200° C. for a predetermined period of time, thereby producing a main constituent powder composed of a barium titanate based compound with an average grain size of 0.1 to 0.2 μm.

Then, additives such as $BaCO_3$ and a sintering aid (for example, $SiO_2$), the specific rare earth element oxide $RO_{3/2}$, and the specific metal oxide $MO_v$ are added, if necessary, to the raw material powder of the main constituent, and these are mixed sufficiently to produce a ceramic raw material powder. Then, this ceramic raw material powder is charged into a ball mill along with an organic binder, an organic solvent, and a grinding medium for carrying out wet mixing to produce a ceramic slurry, and the ceramic slurry is subjected to a shape forming process in accordance with a doctor blade method or the like to produce such ceramic green sheets that provide a thickness of 1 μm or less after firing.

On the other hand, a Mg compound, a Li compound, and if necessary, a Ni compound, a Ti compound, a Ba compound, a Mn compound, etc. are prepared, weighed in predetermined amounts, and then charged into a ball mill along with a grinding medium for carrying out wet mixing. This mixture is dried, and then subjected to a heat treatment at 900° C. to 1000° C. for a predetermined period of time to produce a Mg—Li—O based crystalline oxide.

Another mixture is prepared which contains a Ni powder as a conductive material, an organic vehicle, and an organic solvent, and the Mg—Li—O based crystalline oxide is added in a predetermined amount to the mixture, thereby producing a conductive paste for internal electrodes.

This conductive paste for internal electrodes is used to apply screen printing onto the ceramic green sheets, thereby forming a conductive film in a predetermined pattern on the surfaces of the ceramic green sheets.

Then, the multiple ceramic green sheets with the conductive films formed are stacked in a predetermined direction, sandwiched by ceramic green sheets with no conductive film, subjected to pressure bonding, and cut into a predetermined size to produce a ceramic laminate. The ceramic laminate is subjected to a treatment for removing the binder at a temperature of 300° C. to 500° C., and further subjected to a firing treatment at a temperature of 1100° C. to 1300° C. for about 2 hours under a reducing atmosphere composed of a $H_2$—$N_2$—$H_2O$ gas with its oxygen partial pressure controlled to $10^{-9}$ MPa to $10^{-12}$ MPa. This firing treatment sinters both the conductive films and the ceramic green sheets to provide a ceramic sintered body 1 in which the ceramic layers 6a to 6g and the internal electrodes 2a to 2f are stacked alternately.

Next, a conductive paste for external electrodes is applied to both end surfaces of the ceramic sintered body 1, and subjected to a firing treatment at a temperature of 600° C. to 800° C. to form external electrodes 3a and 3b.

It is to be noted that while the conductive material contained in the conductive paste for external electrodes is also not to be considered particularly limited, the use of Ag or Cu, or a material containing an alloy thereof as its main constituent is preferable in terms of reduction in cost.

As the method for forming the external electrodes 3a and 3b, the conductive paste for external electrodes may be applied onto the both end surfaces of the ceramic laminate, and then subjected to a firing treatment at the same time as the ceramic laminate.

Then, finally, electrolytic plating is applied to form first plating films 4a and 4b composed of Ni, Cu, an Ni—Cu alloy, or the like on the surfaces of the external electrodes 3a and 3b, and second plating films 5a and 5b composed of solder, tin, or the like are further formed on the surfaces of the first plating films 4a and 4b, thereby producing a laminated ceramic capacitor.

As described above, the internal electrodes 2a to 2h containing the Mg—Li—O based crystalline oxide in the present embodiment allows 70% by weight or more of the Mg—Li—O based crystalline oxide to be present in contact with Ni, thereby allowing the thermal shock resistance to be improved while ensuring the dielectric characteristics, the insulation properties, the temperature characteristics of capacitance, and the high temperature load characteristics. As a result, laminated ceramic capacitors which provide favorable properties and characteristics with great reliability can be obtained without causing cracks, etc. even when a rapid change in temperature is caused in the case of mounting.

It is to be noted that the present invention is not to be considered limited to the embodiment described above. While a case of the internal electrodes 2a to 2h containing the Mg—Li—O based crystalline oxide has been described in the embodiment, the Mg—Li—O based crystalline oxide may be added in the process of producing the ceramic raw material powder in the case of the dielectric ceramic layers 6a to 6g containing the Mg—Li—O based crystalline oxide.

Next, examples of the present invention will be described specifically.

EXAMPLE 1

Preparation of Samples

Sample Number 1

$BaCO_3$ and $TiO_2$ were weighed in predetermined amounts as ceramic raw materials, and these weighed materials were charged into a ball mill along with PSZ balls and pure water for mixing and grinding the materials sufficiently in a wet manner, and after drying, subjected to a heat treatment at a temperature of 1150° C. for about two hours, thereby producing a main constituent powder composed of $Ba_{1.03}TiO_3$ with an average grain size of 0.15 μm.

Next, $SiO_2$ and $BaCO_3$ were prepared. The $Ba_{1.03}TiO_3$, $SiO_2$, and $BaCO_3$ were weighed such that $SiO_2$ and $BaCO_3$ were respectively 1.5 parts by mol and 1 part by mol with respect to 100 parts by mol of $Ba_{1.03}TiO_3$, and these weighed materials were charged into a ball mill along with PSZ balls and pure water for wet mixing and grinding the materials, and dried to provide a ceramic raw material powder.

The ceramic raw material powder was charged into a ball mill along with ethanol, a polyvinyl butyral based binder, and PSZ balls for carrying out wet mixing, thereby producing a ceramic slurry, and further, the ceramic slurry was subjected to shape forming in accordance with the doctor blade method to produce such ceramic green sheets that had a thickness of 0.8 μm after firing.

On the other hand, $MgCO_3$ and $Li_2CO_3$ were prepared, and weighed in predetermined amounts such that the combination ratio was 1:1 in terms of molar ratio. Then, these weighed materials were charged into a ball mill along with PSZ balls and pure water for wet mixing and grinding the materials, and after drying, subjected to a heat treatment at a temperature of 900° C. for about 2 hours, thereby producing a Mg—Li—O crystalline oxide with an average grain size of 0.08 μm. It is to be noted that it was confirmed by an X-ray diffractometer (XRD) that the Mg—Li—O oxide is crystalline.

Then, another mixture was prepared containing a Ni powder, an organic vehicle, and an organic solvent. Then, the Mg—Li—O based crystalline oxide was added to the mixture such that the ratio by weight was 99.8:0.2 between the ceramic raw material powder and the Mg—Li—O crystalline oxide, thereby providing a conductive paste for internal electrodes.

The conductive paste for internal electrodes was used to apply screen printing onto the ceramic green sheets, thereby forming a conductive film in a predetermined pattern on the surfaces of the ceramic green sheets.

Then, the ceramic green sheets with the conductive films formed were stacked in a predetermined number of sheets, sandwiched by ceramic green sheets with no conductive film formed, subjected to pressure bonding, and cut into a predetermined size to produce a ceramic laminate. The ceramic laminate was subjected to a heat treatment for removing the binder at a temperature of 300° C. under a nitrogen atmosphere, and further subjected to a firing treatment at a temperature of 1120° C. for about 2 hours under a reducing atmosphere composed of a $H_2$—$N_2$—$H_2O$ gas with its oxygen partial pressure controlled to $10^{-10}$ MPa. This firing treatment sintered both the conductive films and the ceramic green sheets to produce a ceramic sintered body with internal electrodes buried therein.

Next, a conductive paste for external electrodes was prepared, which contained a Cu powder and $B_2O_3$—$Li_2O$—$SiO_2$—BaO based glass frit. The conductive paste for external electrodes was applied onto both end surfaces of the ceramic sintered body, and subjected to a firing treatment at a temperature of 800° C. under a nitrogen atmosphere to form external electrodes, thereby producing a sample according to Example 1.

The dielectric ceramic layers of the obtained sample had a thickness of 0.8 μm and had external dimensions of 1.6 mm in length, 0.8 mm in width, and 0.8 mm in thickness, the area of the electrode opposed per dielectric ceramic layer was 0.9 $mm^2$, and the effective number of stacked layers was 400.

Further, a fracture surface was polished, observed by FE-SEM (field emission scanning electron microscope), and subjected to a mapping analysis for the composition by WDX (wavelength dispersive X-ray microanalyzer) to confirm the generation of a Mg—Li—O crystalline oxide.

Sample Number 2

A main constituent powder composed of $Ba_{1.03}TiO_3$ and a Mg—Li—O based crystalline oxide were produced in accordance with the same method and procedure as for sample number 1.

Then, $SiO_2$ and $BaCO_3$ were prepared. The $Ba_{1.03}TiO_3$, $SiO_2$, and $BaCO_3$ were weighed such that $SiO_2$ and $BaCO_3$ were respectively 1.5 parts by mol and 1 part by mol with respect to 100 parts by mol of $Ba_{1.03}TiO_3$, and a ceramic raw material powder was produced from the weighed $SiO_2$ and $BaCO_3$. Then, the Mg—Li—O based crystalline oxide was weighed such that the ratio by weight was 99.8:0.2 between the ceramic raw material powder and the Mg—Li—O based crystalline oxide. The weighed materials were charged into a ball mill along with PSZ balls and pure water for wet mixing and grinding the materials, and dried to obtain a ceramic raw material powder.

Then, the ceramic raw material powder was charged into a ball mill along with ethanol, a polyvinyl butyral based binder, and PSZ balls for carrying out wet mixing, thereby producing a ceramic slurry, and further, the ceramic slurry was subjected to shape forming in accordance with the doctor blade method to produce ceramic green sheets that had a thickness of 0.8 μm after firing.

A conductive paste for internal electrodes was prepared which contained a Ni powder, an organic vehicle, and an organic solvent, and used to apply screen printing onto the ceramic green sheets, thereby forming a conductive film in a predetermined pattern on the surfaces of the ceramic green sheets.

Then, sample number 2 was produced in accordance with the same method and procedure as for sample number 1.

In addition, as in sample number 2, a fracture surface was polished, observed by FE-SEM, and subjected to a mapping analysis for the composition by WDX to confirm the generation of a Mg—Li—O crystalline oxide.

Sample Number 3

$Ba_{1.03}TiO_3$ was produced in accordance with the same method and procedure as for sample number 1.

Then, $SiO_2$, $BaCO_3$, $MgCO_3$, and $Li_2CO_3$ were prepared. The $Ba_{1.03}TiO_3$, $SiO_2$, and $BaCO_3$ were weighed such that $SiO_2$ and $BaCO_3$ were respectively 1.5 parts by mol and 1 part by mol with respect to 100 parts by mol of $Ba_{1.03}TiO_3$, and further, $MgCO_3$ and $Li_2CO_3$ were weighed so as to make up 0.2 weight % in the ceramic raw material powder.

It is to be noted that the mixing ratio between $MgCO_3$ and $Li_2CO_3$ was controlled to 1:1 in terms of molar ratio. The weighed materials were charged into a ball mill along with PSZ balls and pure water for wet mixing and grinding the materials, and dried to obtain a ceramic raw material powder.

Then, the ceramic raw material powder was charged into a ball mill along with ethanol, a polyvinyl butyral based binder, and PSZ balls for carrying out wet mixing, thereby producing a ceramic slurry, and further, the ceramic slurry was subjected to shape forming in accordance with the doctor blade method to produce such ceramic green sheets that had a thickness of 0.8 μm after firing.

A conductive paste for internal electrodes was prepared which contained a Ni powder, an organic vehicle, and an organic solvent, and used to apply screen printing onto the ceramic green sheets, thereby forming a conductive film in a predetermined pattern on the surfaces of the ceramic green sheets.

Then, sample number 3 was produced in accordance with the same method and procedure as for sample number 1.

For sample number 3, a fracture surface was polished, then observed by FE-SEM, and subjected to a mapping analysis for the composition by WDX to confirm no Mg—Li—O crystalline oxide generated.

Evaluation of Samples

The respective samples of sample numbers 1 to 3 were analyzed for any polished cross sections by time of flight-secondary ion mass spectrometry (hereinafter, referred to as "TOF-SIMS") to confirm the components of a segregated object and the locations of the segregated object. More specifically, the surfaces of the samples were irradiated with ion beams (primary ions), secondary ions emitted from the samples were detected in response to time of flight, and the respective detectable amounts in terms of mass were calculated to identify the substances, and confirm the components of a segregated object and the locations of the segregated object.

It has been determined from the results that a segregated object of Mg—Li—O is present in the internal electrodes in the case of sample number 1, whereas a segregated object of Mg—Li—O is present in the ceramic layers in the case of sample number 2. The segregated objects were examined by electron beam diffraction in a transmission electron microscope (hereinafter, referred to as "TEM") to confirm that the segregated objects are crystalline.

In addition, it was confirmed that 70% or more of the Mg—Li—O based crystalline oxide was present in contact with Ni in the case of sample number 1.

In contrast, no segregated object of crystalline oxide was present in the case of sample number 3 in either the internal electrodes or the ceramic layers, because the crystalline oxide was not added to either the conductive paste or the ceramic raw material powder in the manufacturing process.

Next, the respective samples of sample numbers 1 to 3 were evaluated for dielectric constant, insulation resistance, temperature characteristics of capacitance, thermal shock resistance, and high temperature load characteristics in accordance with the following methods.

The dielectric constant was obtained from the measurement value of capacitance C, which was measured with the use of an automatic bridge measurement instrument under the conditions of a frequency of 1 kHz, an effective voltage of 0.5 Vrms, and a temperature of 25° C., and from the sample dimensions.

The insulation resistance was evaluated by the CR product which refers to the product of capacitance C and insulation resistance R from the measurement of log IR obtained by applying a direct-current voltage of 6.3 V at a temperature of 25° C. for 180 seconds.

The temperature characteristics of capacitance was evaluated by measuring the rates of capacitance change to temperature $\Delta C_{-55}/C_{25}$, $\Delta C_{+85}/C_{25}$, and $\Delta C_{+105}/C_{25}$, respectively, at −55° C., +85° C., and +105° C. with a capacitance at +25° C. as a reference. It is to be noted that if the rates of capacitance change to temperature fall within ±22% in the temperature range of −55° C. to +105° C., the X6S characteristics of the EIA standards will be satisfied.

The thermal shock resistance was evaluated by carrying out a thermal shock resistance test on 50 samples of each sample number. More specifically, the evaluation was carried out in such a way that the 50 samples of each sample number were immersed in solder baths with their temperatures set to 275° C. and 325° C. for 3 minutes, and the respective samples were pulled up from the solder baths, covered with a resin, then subjected to polishing, and observed under a microscope to determine samples which were defectives if the samples had even one crack found.

The high temperature load characteristics were evaluated by carrying out a high temperature load test for 100 of each sample number. More specifically, the evaluation was carried out in such a way that a voltage of 7 V was applied at a temperature of 105° C. so as to provide an electric field strength of 10 kV/mm, the change in insulation resistance with time was measured, and a sample with its insulation resistance decreased to 200 kΩ or less after a lapse of 1000 hours was determined as a defective.

Table 1 shows the dielectric constant, the CR product, the temperature characteristics of capacitance, the thermal shock resistance, and the high temperature load characteristics for sample numbers 1 to 3.

TABLE 1

| Sample No. | Crystalline Oxide (Segregated Object) | Dielectric Constant (—) | CR Product (Ω·F) | Temperature Characteristics of Capacitance | | | Thermal Shock Resistance | | High Temperature Load Characteristics |
|---|---|---|---|---|---|---|---|---|---|
| | | | | $\Delta C_{-55}/C_{25}$ | $\Delta C_{85}/C_{25}$ | $\Delta C_{105}/C_{25}$ | 275° C. | 325° C. | |
| 1 | Present in Internal Electrodes | 2950 | 2500 | −5.5 | −9 | −14 | 0/50 | 0/50 | 0/100 |
| 2 | Present in Ceramic Layers | 2980 | 2500 | −5.1 | −9.3 | −14.1 | 0/50 | 1/50 | 0/100 |
| 3* | None | 3050 | 2600 | −4.1 | −9.8 | −14.6 | 1/50 | 7/50 | 0/100 |

*outside the scope of the present invention

Sample numbers 1 to 3 all provided favorable results for the dielectric constant, the insulation resistance, the temperature characteristics of capacitance, and the high temperature load characteristics.

In the case of sample number 3, there was only one defective among 50 samples at a temperature of 275° C. in the thermal shock resistance test, whereas there were seven defectives among 50 samples at a temperature of 325° C., an increase in the incidence ratio of defectives.

In contrast, the thermal shock resistance has been found to be favorable in the case of sample numbers 1 and 2 because there were no defective when the thermal shock resistance test was carried out at 275° C., and because there was no or only one defective even when the thermal shock resistance test was carried out at 325° C. In particular, there were no detective at all in the case of sample number 2, because of 70% or more of the Mg—Li—O based crystalline oxide in contact with Ni in the internal electrodes.

EXAMPLE 2

Preparation of Samples $BaCO_3$, $CaCO_3$, $SrCO_3$, $TiO_2$, $ZrO_2$, and $HfO_2$ were prepared as ceramic raw materials. These ceramic raw materials were weighed in predetermined amounts, charged into a ball mill along with PSZ balls and pure water for wet mixing and grinding the materials, and after drying, subjected to a heat treatment at a temperature of 1100° C. to 1200° C. for about 2 hours, thereby producing a main constituent powder with an average grain size of 0.11 μm to 0.17 μm.

Next, $SiO_2$ and $BaCO_3$ were prepared. The main constituent powder, $SiO_2$, and $BaCO_3$ were weighed such that $SiO_2$ and $BaCO_3$ were respectively 2 parts by mol and 1 part by mol with respect to 100 parts by mol of the main constituent, and these weighed materials were charged into a ball mill along with PSZ balls and pure water for wet mixing and grinding the materials, and dried to obtain a ceramic raw material powder.

Then, the ceramic raw material powder was charged into a ball mill along with ethanol, a polyvinyl butyral based binder, and PSZ balls for carrying out wet mixing, thereby producing a ceramic slurry, and further, the ceramic slurry was subjected to shape forming in accordance with a doctor blade method to produce such ceramic green sheets that had a thickness of 0.8 μm after firing.

Next, $MgCO_3$, NiO, $BaCO_3$, $TiO_2$, $Li_2CO_3$, and $MnO_2$ were prepared. These materials were weighed such that the combination ratio was $MgCO_3$:NiO:$BaCO_3$:$TiO_2$:$Li_2CO_3$:$MnO_2$=15:65:15:2:20:1 in terms of molar ratio, and these weighed materials were charged into a ball mill along with PSZ balls and pure water for wet mixing and grinding the materials, and after drying, subjected to a heat treatment at a temperature of 1000° C. for about 2 hours, thereby producing a Mg—Ni—Ti—Ba—Li—Mn—O based crystalline oxide with an average grain size of 0.05 μm. It is to be noted that it was confirmed by an X-ray diffractometer (XRD) that the oxide is crystalline, as in the case of sample number 1 according to Example 1.

Another mixture was prepared containing a Ni powder, an organic vehicle, and an organic solvent. Then, the Mg—Ni—Ti—Ba—Li—Mn—O based crystalline oxide was added to the mixture such that the ratio by weight was 99.7:0.3 between the ceramic raw material powder and the Mg—Ni—Ti-Da—Li—Mn—O based crystalline oxide, thereby providing a conductive paste for internal electrodes.

Sample numbers 11 to 16 were produced in accordance with the same procedure and method as for sample number 1 according to Example 1.

Evaluation of Samples

For the respective samples of sample numbers 11 to 16, the components of a segregated object and the locations of the segregated object were confirmed in accordance with a TOF-SIMS method, as in the case of Example 1.

The results confirmed that the respective samples of sample numbers 11 to 16 each have a segregated object of Mg—Ni—Ti—Ba—Li—Mn—O present in the internal electrodes, and 70% or more of the crystalline oxide is in contact with Ni. In addition, these segregated objects were examined by electron beam diffraction in TEM to confirm that the segregated objects are crystalline.

The respective samples of sample numbers 11 to 16 were evaluated for the dielectric constant, the insulation resistance, the temperature characteristics of capacitance, the thermal shock resistance, and the high temperature load characteristics in accordance with the same methods and procedures as in Example 1.

Table 2 shows the dielectric constant, the CR product, the temperature characteristics of capacitance, the thermal shock resistance, and the high temperature load characteristics for sample numbers 11 to 16.

TABLE 2

| Sample No. | Composition of Main Constituent | Dielectric Constant (—) | CR Product ($\Omega \cdot F$) | Temperature Characteristics of Capacitance | | | Thermal Shock Resistance | | High Temperature Load Characteristics |
|---|---|---|---|---|---|---|---|---|---|
| | | | | $\Delta C_{-55}/C_{25}$ | $\Delta C_{85}/C_{25}$ | $\Delta C_{105}/C_{25}$ | 275° C. | 325° C. | |
| 11 | $BaTiO_3$ | 3150 | 2370 | −6.3 | −9.5 | −13.9 | 0/50 | 0/50 | 0/100 |
| 12 | $(Ba_{0.98}Sr_{0.02})(Ti_{0.99}Hf_{0.01})O_3$ | 2100 | 2350 | −6.5 | −11.2 | −15.4 | 0/50 | 0/50 | 0/100 |
| 13 | $(Ba_{0.8}Ca_{0.2})(Ti_{0.99}Zr_{0.01})O_3$ | 2850 | 2120 | −5.3 | −11.4 | −15.6 | 0/50 | 0/50 | 0/100 |
| 14 | $(Ba_{0.95}Ca_{0.05})(Ti_{0.98}Zr_{0.02})O_3$ | 2800 | 2100 | −4.8 | −11 | −14.3 | 0/50 | 0/50 | 0/100 |
| 15 | $(Ba_{0.98}Ca_{0.02})(Ti_{0.98}Zr_{0.02})O_3$ | 2950 | 2220 | −4.3 | −12.3 | −15.4 | 0/50 | 0/50 | 0/100 |
| 16 | $(Ba_{0.98}Sr_{0.01}Ca_{0.01})(Ti_{0.99}Zr_{0.005}Hf_{0.005})O_3$ | 3100 | 2150 | −4.5 | −11.6 | −15 | 0/50 | 0/50 | 0/100 |

As is clear from Table 2, sample numbers 11 to 16 all provided favorable results for the properties and characteristics of the dielectric constant, insulation resistance, temperature characteristics of capacitance, thermal shock resistance, and high temperature load characteristics.

More specifically, it has been confirmed that the crystalline oxide even containing Ni, Ti, Ba, Mn, etc. have no influence on the properties or characteristics as long as the crystalline oxide contains at least Mg and Li.

EXAMPLE 3

Production of Samples $BaCO_3$, $CaCO_3$, $TiO_2$, and $ZrO_2$ were prepared as ceramic raw materials. These ceramic raw materials were weighed in predetermined amounts, charged into a ball mill along with PSZ balls and pure water for wet mixing and grinding the materials, and after drying, subjected to a heat treatment at a temperature of 1150° C. for about 2 hours, thereby producing a main constituent powder made of $(Ba_{0.94}Ca_{0.06})(Ti_{0.996}Zr_{0.004})O_3$, with an average grain size of 0.16 μm.

Next, $RO_{3/2}$ (R may be La, Ce, Pr, Nd, Sm, Eu, Gd, Tb, Dy, Ho, Er, Tm, Yb, Lu, and Y), $MO_v$ (M may be Mn, Ni, Co, Fe, Cr, Cu, Mg, Li, Al, Mo, W, and V), and $SiO_2$ were prepared. Then, the main constituent powder, $RO_{3/2}$, $MO_v$, and $SiO_2$ were weighed such that $RO_{3/2}$, $MO_M$, and $SiO_2$ were respectively 0 to 3.5 parts by mol, 0 to 6.2 parts by mol, and 2 parts by mol with respect to 100 parts by mol of the main constituent, and these weighed materials were charged into a ball mill along with PSZ balls and pure water for wet mixing and grinding the materials, and dried to obtain a ceramic raw material powder.

Then, the ceramic raw material powder was charged into a ball mill along with ethanol, a polyvinyl butyral based binder, and PSZ balls for carrying out wet mixing, thereby producing a ceramic slurry, and further, the ceramic slurry was subjected to shape forming in accordance with a doctor blade method to produce such ceramic green sheets that had a thickness of 0.8 μm after firing.

$MgCO_3$, NiO, and $Li_2CO_3$ were prepared. These materials were weighed such that the combination ratio was $MgCO_3$:$NiO$:$Li_2CO_3$=5:10:1 in terms of molar ratio, and these weighed materials were charged into a ball mill along with PSZ balls and pure water for wet mixing and grinding the materials, and after drying, subjected to a heat treatment at a temperature of 1000° C. for about 2 hours, thereby producing a Mg—Ni—Li—O based crystalline oxide with an average grain size of 0.06 μm. It is to be noted that it was confirmed by an X-ray diffractometer (XRD) that the oxide is crystalline, as in the case of sample number 1 of Example 1.

Another mixture was prepared containing a Ni powder, an organic vehicle, and an organic solvent. The Mg—Ni—Li—O based crystalline oxide was added to the mixture such that the ratio by weight was 99.9:0.1 between the ceramic raw material powder and the Mg—Ni—Li—O based crystalline oxide, thereby providing a conductive paste for internal electrodes.

Sample numbers 21 to 39 were produced in accordance with the same procedure and method as for sample number 1 according to Example 1.

Evaluation of Samples

For the respective samples of sample numbers 21 to 39, the components of a segregated object and the locations of the segregated object were confirmed in accordance with a TOF-SIMS method, as in the case of Example 1.

The results confirmed that the respective samples of sample numbers 21 to 39 each have a segregated object of Mg—Ni—Li—O present in the internal electrodes, and 70% or more of the crystalline oxide is in contact with Ni. In addition, these segregated objects were examined by electron beam diffraction in TEM to confirm that the segregated objects are crystalline.

Next, the respective samples of sample numbers 21 to 39 were evaluated for the dielectric constant, the insulation resistance, the temperature characteristics of capacitance, the thermal shock resistance, and the high temperature load characteristics in accordance with the same methods and procedures as in Example 1. It is to be noted that the insulation resistance was measured not only after a lapse of 1000 hours but also after a lapse of 2000 hours in the high temperature load test to evaluate the high temperature load characteristics.

Table 3 shows the composition for sample numbers 21 to 39, and Table 4 shows the dielectric constant, the CR product, the temperature characteristics of capacitance, the thermal shock resistance, and the high temperature load characteristics for sample numbers 21 to 39.

TABLE 3

| Sample | $(Ba_{0.94}Ca_{0.06})(Ti_{0.996}Zr_{0.004})O_3 + aRO_{3/2} + bMO_2 + 2SiO_2$ | | | |
|---|---|---|---|---|
| No. | R | a | M | b |
| 21** | — | 0.0 | Mg/W(1.5/0.3) | 1.80 |
| 22 | Ho(0.1) | 0.1 | V/Ni(0.3/2) | 2.30 |
| 23 | Gd/Dy(0.5/0.7) | 1.2 | V/Co/Li/Mo(0.3/1/1/0.2) | 2.50 |
| 24 | Nd/Ho(0.4/2.6) | 3.0 | Ni/Mn/Cu(1/0.3/1) | 2.30 |
| 25** | Dy(3.5) | 3.5 | Mg/Cr/Cu(2/0.2/0.3) | 2.50 |
| 26** | Er/Y(1/1) | 2.0 | — | 0.00 |
| 27 | Dy/Tb(1.5/0.5) | 2.0 | Li/Mn(0.1/0.1) | 0.20 |
| 28 | Ho(2.2) | 2.2 | Ni/Li/Co(0.5/0.5/0.25) | 1.25 |
| 29 | Er/Y(0.8/1.2) | 2.0 | Fe/V/Al/Mg (0.1/0.1/0.5/1.5) | 2.20 |
| 30 | Dy/Yb(0.6/0.6) | 1.2 | Mo/Ni(0.5/1) | 1.50 |
| 31 | Lu/Ho/Ce(0.4/1/0.5) | 1.9 | Mg/Mn(4.8/0.2) | 5.00 |
| 32** | Sm/Y(0.2/1) | 1.2 | V/Mo/Mg(0.1/0.1/6) | 6.20 |
| 33 | Eu/Dy(0.3/1.5) | 1.8 | Al/W(1.5/0.3) | 1.80 |
| 34 | Y/Gd(1/1) | 2.0 | V/Mn/Mg(0.2/0.2/2) | 2.40 |
| 35 | Y(1.8) | 1.8 | Al/Mn/Mg/Mo (1/0.3/1/0.1) | 2.40 |
| 36 | Pr/La/Ho (0.5/0.2/1.1) | 1.8 | Cu/Li(0.25/1) | 1.25 |
| 37 | Dy/Tm(0.4/1.3) | 1.7 | Mg/Mn/(2/0.3) | 2.30 |
| 38 | Lu/Dy(1/1) | 2.0 | V/Co(0.3/1.8) | 2.10 |
| 39 | Dy(1.8) | 1.8 | Li/Mn/Mg(1/0.1/1) | 2.10 |

*outside the scope of the second embodiment

TABLE 4

| Sample No. | Dielectric Constant (—) | CR Product (Ω·F) | Temperature Characteristics of Capacitance | | | Thermal Shock Resistance | | High Temperature Load Characteristics | |
|---|---|---|---|---|---|---|---|---|---|
| | | | $\Delta C_{-55}/C_{25}$ | $\Delta C_{85}/C_{25}$ | $\Delta C_{105}/C_{25}$ | 275° C. | 325° C. | 1000 hours | 2000 hours |
| 21** | 3000 | 2600 | −5.7 | −9.5 | −14.2 | 0/50 | 0/50 | 0/100 | 2/100 |
| 22 | 2650 | 2850 | −6.4 | −12.8 | −14.5 | 0/50 | 0/50 | 0/100 | 0/100 |
| 23 | 2450 | 2950 | −5.7 | −11.5 | −13.4 | 0/50 | 0/50 | 0/100 | 0/100 |
| 24 | 2250 | 2850 | −2.3 | −10.2 | −12.1 | 0/50 | 0/50 | 0/100 | 0/100 |
| 25** | 1350 | 2650 | −2.2 | −9.1 | −10.6 | 0/50 | 0/50 | 0/100 | 0/100 |
| 26** | 3150 | 2450 | −5.1 | −9.1 | −14.5 | 0/50 | 0/50 | 0/100 | 4/100 |
| 27 | 2600 | 3450 | −4.5 | −12 | −13 | 0/50 | 0/50 | 0/100 | 0/100 |
| 28 | 2550 | 3050 | −4 | −11.8 | −13.1 | 0/50 | 0/50 | 0/100 | 0/100 |
| 29 | 2350 | 2950 | −3.8 | −11.2 | −12.1 | 0/50 | 0/50 | 0/100 | 0/100 |
| 30 | 2300 | 2700 | −1.5 | −9.8 | −11.4 | 0/50 | 0/50 | 0/100 | 0/100 |
| 31 | 2150 | 2650 | −1.6 | −9.8 | −11.9 | 0/50 | 0/50 | 0/100 | 0/100 |
| 32** | 1400 | 2400 | −1.8 | −8.4 | −10.8 | 0/50 | 0/50 | 0/100 | 0/100 |
| 33 | 2450 | 2950 | −4.3 | −11.6 | −12.1 | 0/50 | 0/50 | 0/100 | 0/100 |
| 34 | 2400 | 2850 | −3.7 | −10.6 | −11.9 | 0/50 | 0/50 | 0/100 | 0/100 |
| 35 | 2500 | 2950 | −3.6 | −11.4 | −12.6 | 0/50 | 0/50 | 0/100 | 0/100 |
| 36 | 2400 | 2900 | −2.8 | −12.1 | −12.8 | 0/50 | 0/50 | 0/100 | 0/100 |
| 37 | 2450 | 2950 | −2.3 | −12.2 | −13.8 | 0/50 | 0/50 | 0/100 | 0/100 |
| 38 | 2400 | 2850 | −3.8 | −11.3 | −12.2 | 0/50 | 0/50 | 0/100 | 0/100 |
| 39 | 2500 | 2900 | −3.8 | −11.4 | −11.5 | 0/50 | 0/50 | 0/100 | 0/100 |

*outside the scope of the second embodiment

As is clear from Tables 3 and 4, sample numbers 21 to 39 all provided favorable results for the properties and characteristics of the insulation resistance, temperature characteristics of capacitance, and high temperature load characteristics.

However, sample number 21, because of no element R added, provided a high temperature load characteristic of no defectives after a lapsed of 1000 hours, but two defectives among the 100 samples after a lapse of 2000 hours.

In addition, sample number 26, because of no element M added, provided a high temperature load characteristic of no defective after a lapsed of 1000 hours, but four defectives caused among 100 samples after a lapse of 2000 hours.

On the other hand, sample number 25 caused a decrease in dielectric constant, because of the excess amount, 3.5 parts by mol, of the element M with respect to 100 parts by mol of the main constituent.

In addition, sample number 35 caused a decrease in dielectric constant, because of the excess amount, 6.2 parts by mol of the element M with respect to 100 parts by mol of the main constituent.

In contrast, sample numbers 22 to 24, 27 to 31, and 33 to 39 provided favorable dielectric constants, and caused no defectives even after a lapse of 2000 hours in the high temperature load test, allowing favorable high temperature load characteristics to be obtained, because of the samples containing 0.1 to 3.0 parts by mol of element R with respect to 100 parts by mol of the main constituent and containing 0.2 to 5.0 parts by mol of element M with respect to 100 parts by mol of the main constituent.

Accordingly, it has been determined that the samples containing 0.1 to 3.0 parts by mol of element R with respect to 100 parts by mol of the main constituent and containing 0.2 to 5.0 parts by mol of element M with respect to 100 parts by mol of the main constituent can improve the high temperature load characteristics without damaging the dielectric characteristics, and thus make a further improvement in reliability.

Even when the dielectric ceramic layer is reduced in layer thickness to 1 μm or less to increase the number of stacked layers to 400 or more, the thermal shock resistance is improved without damaging the properties and characteristics such as the dielectric characteristics, insulation properties, temperature characteristics, and the high temperature load characteristics.

What is claimed is:

1. A laminated ceramic capacitor comprising stacked dielectric ceramic layers containing, as their main constituent, a barium titanate based compound and at interfaces between dielectric ceramic layers, internal electrodes containing Ni as their main constituent,
    wherein a crystalline oxide comprising Mg and Li is present in at least one of the internal electrodes and the dielectric ceramic layers and wherein 70% or more in terms of number of the crystalline oxide grains is in contact with the Ni in the internal electrodes.

2. The laminated ceramic capacitor according to claim 1, wherein the barium titanate compound is represented by the formula ABO3, and contains Ba in the range of 78 to 100 mol%, Sr in the range of 0 to 2 mol%, and Ca in the range of 0 to 20 mol% at the A site, and contains Ti in the range of 96 to 100 mol%, Zr in the range of 0 to 2 mol%, and Hf in the range of 0 to 2 mol% at the B site.

3. The laminated ceramic capacitor according to claim 2, wherein the ceramic layers contain at least one element R which is selected from the group consisting of La, Ce, Pr, Nd, Sm, Eu, Gd, Tb, Dy, Ho, Er, Tm, Yb, Lu, and Y; and
    at least one element M which is selected from the group consisting of Mn, Ni, Co, Fe, Cr, Cu, Mg, Li, Al, Mo, W, and V, and
    the content of the element R is 0.1 to 3.0 parts by mol with respect to 100parts by mol of the main constituent, and the content of the element M is 0.2 to 5 parts by mol with respect to 100 parts by mol of the main constituent.

4. The laminated ceramic capacitor according to claim 3, wherein the weight ratio of dielectric ceramic layers to crystalline oxide is 99.7:0.3 to 99.9:0.1.

5. The laminated ceramic capacitor according to claim 4, wherein R is one member of said group.

6. The laminated ceramic capacitor according to claim 4, wherein R is more than one member of said group.

7. The laminated ceramic capacitor according to claim 4, wherein M is one member of said group.

8. The laminated ceramic capacitor according to claim 4, wherein M is more than one member of said group.

9. The laminated ceramic capacitor according to claim 1, wherein the ceramic layers contain at least one element R which is selected from the group consisting of La, Ce, Pr, Nd, Sm, Eu, Gd, Tb, Dy, Ho, Er, Tm, Yb, Lu, and Y; and at least one element M which is selected from the group consisting of Mn, Ni, Co, Fe, Cr, Cu, Mg, Li, Al, Mo, W, and V, and
    the content of the element R is 0.1 to 3.0 parts by mol with respect to 100parts by mol of the main constituent, and the content of the element M is 0.2 to 5 parts by mol with respect to 100 parts by mol of the main constituent.

10. The laminated ceramic capacitor according to claim 9, wherein R is one member of said group.

11. The laminated ceramic capacitor according to claim 9, wherein R is more than one member of said group.

12. The laminated ceramic capacitor according to claim 9, wherein M is one member of said group.

13. The laminated ceramic capacitor according to claim 9, wherein M is more than one member of said group.

14. The laminated ceramic capacitor according to claim 1, wherein the ceramic layers contain at least one element R which is selected from the group consisting of La, Ce, Pr, Nd, Sm, Eu, Gd, Tb, Dy, Ho, Er, Tm, Yb, Lu, and Y; and at least one element M which is selected from the group consisting of Mn, Ni, Co, Fe, Cr, Cu, Mg, Li, Al, Mo, W, and V, and
    the content of the element R is 0.1 to 3.0 parts by mol with respect to 100 parts by mol of the main constituent, and the content of the element M is 0.2 to 5 parts by mol with respect to 100 parts by mol of the main constituent.

15. The laminated ceramic capacitor according to claim 14, wherein R is one member of said group.

16. The laminated ceramic capacitor according to claim 14, wherein R is more than one member of said group.

17. The laminated ceramic capacitor according to claim 14, wherein M is one member of said group.

18. The laminated ceramic capacitor according to claim 14, wherein M is more than one member of said group.

19. The laminated ceramic capacitor according to claim 14, wherein M is more than one member of said group.

\* \* \* \* \*